US011285732B2

(12) United States Patent
Hatta et al.

(10) Patent No.: US 11,285,732 B2
(45) Date of Patent: Mar. 29, 2022

(54) WHITE INK, INK ACCOMMODATING CONTAINER, RECORDING DEVICE, RECORDING METHOD, AND RECORDED MATTER

(71) Applicant: RICOH COMPANY, LTD., Tokyo (JP)

(72) Inventors: Chikako Hatta, Kanagawa (JP); Ryo Miyakoshi, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 15 days.

(21) Appl. No.: 16/833,737

(22) Filed: Mar. 30, 2020

(65) Prior Publication Data

US 2020/0307246 A1    Oct. 1, 2020

(30) Foreign Application Priority Data

Apr. 1, 2019 (JP) .............................. JP2019-069946

(51) Int. Cl.
*B41J 2/21* (2006.01)
*C09D 11/36* (2014.01)
*C09D 11/38* (2014.01)

(52) U.S. Cl.
CPC ........... *B41J 2/2117* (2013.01); *B41J 2/2107* (2013.01); *C09D 11/36* (2013.01); *C09D 11/38* (2013.01)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/033; C09D 11/037; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003;

(Continued)

(56) References Cited

U.S. PATENT DOCUMENTS

2008/0241485 A1* 10/2008 Shimohara ........... C09D 11/326
 428/195.1
2010/0240830 A1* 9/2010 Shimohara ........... C09D 11/326
 524/589

(Continued)

FOREIGN PATENT DOCUMENTS

JP   2014-189558   10/2014
JP   2017-218523   12/2017
JP   2018-039936   3/2018

*Primary Examiner* — Manish S Shah
(74) *Attorney, Agent, or Firm* — Grüneberg and Myers PLLC

(57) ABSTRACT

White ink includes a crystalline urethane resin and a coloring material.

7 Claims, 1 Drawing Sheet

(58) Field of Classification Search
CPC ............... B41J 25/312; B41J 2025/008; B41J 2202/21; B41J 2/17596; B41J 2/16508; B41J 2/1652; B41J 2/175; B41J 2/17563; B41J 11/00; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2003/2237; C14C 11/006

See application file for complete search history.

(56) References Cited

U.S. PATENT DOCUMENTS

| | | | | |
|---|---|---|---|---|
| 2011/0018928 A1* | 1/2011 | Li | ............ | C09D 11/30 |
| | | | | 347/20 |
| 2013/0267656 A1* | 10/2013 | Berge | ............ | C09D 11/324 |
| | | | | 524/591 |
| 2015/0077501 A1* | 3/2015 | Breton | ............ | C09D 11/037 |
| | | | | 347/225 |
| 2015/0080527 A1* | 3/2015 | Berge | ............ | C09D 11/322 |
| | | | | 524/591 |
| 2016/0222231 A1* | 8/2016 | Allen | ............ | C09D 11/326 |
| 2016/0230027 A1* | 8/2016 | Birau | ............ | C09D 11/02 |
| 2017/0335123 A1* | 11/2017 | Nakamura | ............ | B41J 2/01 |
| 2018/0004110 A1* | 1/2018 | Ron | ............ | C09D 11/101 |
| 2020/0002558 A1 | 1/2020 | Iwasaki et al. | | |

* cited by examiner

WHITE INK, INK ACCOMMODATING CONTAINER, RECORDING DEVICE, RECORDING METHOD, AND RECORDED MATTER

CROSS-REFERENCE TO RELATED APPLICATIONS

This patent application is based on and claims priority pursuant to 35 U.S.C. § 119 to Japanese Patent Application No. 2019-069946, filed on Apr. 1, 2019, in the Japan Patent Office, the entire disclosure of which is hereby incorporated by reference herein.

BACKGROUND

Technical Field

The present invention relates to white ink, an ink accommodating container, a recording device, a recording method, and recorded matter.

Description of the Related Art

Since inkjet recording devices are relatively quiet, have low running costs, and are capable of printing color images with ease, they are now widely used at home to output digital information.

Inkjet technologies have long been appealing in commercial and industrial use in addition to home use.

However, industrial and commercial recording media cover a wide range of from paper and transparent products to colored products.

When images and text are printed on these recording media in white or with color ink, it is necessary to sufficiently conceal the transparency or color of the recording medium with ink. White ink is used to conceal the transparency or color of a recording medium in white.

Substances such as titanium dioxide, which has excellent concealing and coloring properties, are widely used. Further, the particle diameter thereof is preferably controlled to be from about 200 nm to about 300 nm to scatter visible light in order to obtain a high concealing ability with these white coloring materials. However, a white color material such as titanium dioxide has a higher specific gravity than an ink medium and thus tends to settle. Moreover, when such a white color material is used in a low-viscosity ink such as an aqueous ink or solvent-based ink, the sedimentation speed becomes faster.

Coated printing paper having poor ink absorbency and non-ink absorptive plastic media (film) are used as recording media for commercial or industrial use. Therefore, ink having sufficient scratch resistance for such media have been demanded. In particular, when printed with white ink containing a white coloring material such as titanium dioxide, the coloring material adheres to the outermost surface of the recording medium and thus is easily peeled off. Therefore, an ink that demonstrates stronger abrasion resistance has been demanded.

SUMMARY

According to embodiments of the present disclosure, provided is a white ink which includes a crystalline urethane resin and a coloring material.

As another aspect of the present disclosure, provided is recorded matter which contains a recording medium, a white printing layer formed on the recording medium, wherein the white printing layer comprises a crystalline urethane resin and a coloring material.

As another aspect of the present disclosure, provided is a white ink which contains a urethane resin and a coloring material, wherein the white ink has a melting peak as measured by a differential scanning calorimeter in the following conditions:

Measuring Conditions:

four grams of the white ink is dried at 70 degrees C. for 18 hours and at 120 degrees C. for 15 minutes to prepare a measuring sample, thereafter, a thermal property of the measuring sample is measured by a differential scanning calorimeter Q2000, available from TA Instruments, is measured in a nitrogen atmosphere in a flow rate of 50 mL/minutes under the following temperature conditions: a graph of endotherm amount and exotherm amount is created from measuring results to determine whether the measuring sample has the melting peak in a second temperature rising; and Temperature Conditions:
Starting Temperature: −20 degrees C.
First temperature rising rate: 10 degrees C./min
Ending temperature: 130 degrees C.
Holding time: one minute
Temperature falling rate: 10 degrees C./min
Ending temperature: −50 degrees C.
Holding time: five minutes
Second temperature rising rate: 10 degrees C./min
Ending temperature: 130 degrees C.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
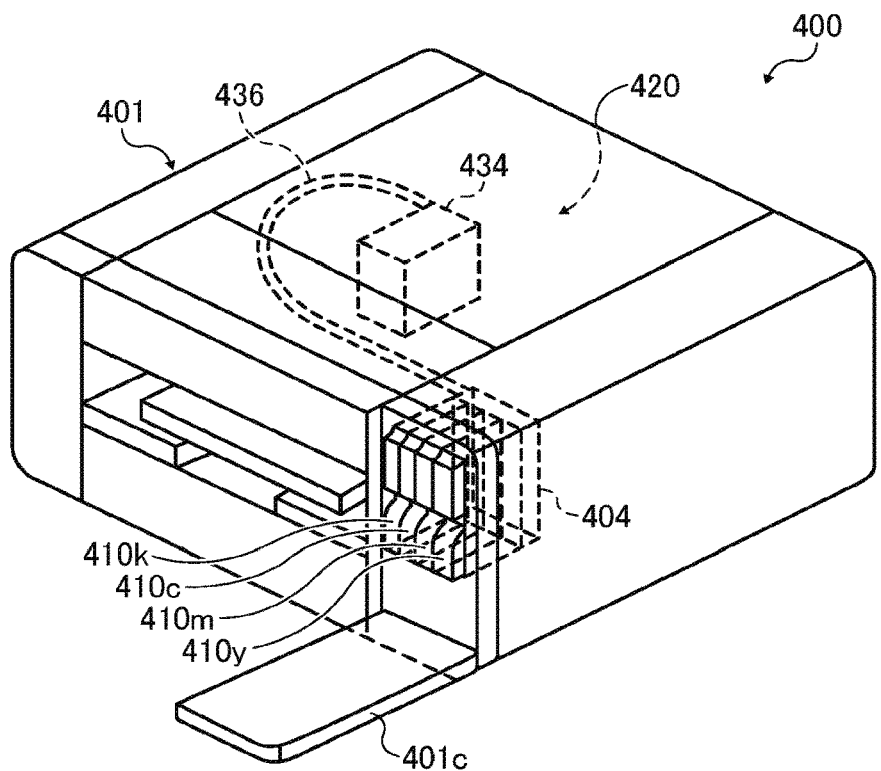
FIG. 1 is a diagram illustrating a perspective view of an example of a recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An ink containing a crystalline polyester resin that can use a white pigment has been proposed in JP-2017-218523-A1.

However, this has a problem of the coloring material having poor sedimentation property in the white ink. Therefore, it is difficult to obtain a white ink having a high level of brightness and scratch resistance of an image formed on a recording medium with the white ink.

Next, aspects of the present disclosure are described.

White Ink

The white ink of the present embodiment includes a coloring material and a resin, and may furthermore optionally include components such as water, an organic solvent, and a surfactant. The brightness (degree of whiteness) by Hunter of an image formed with the white ink of the present embodiment is preferably 60 or greater and more preferably 70 or greater, but is not limited thereto.

Resin

The white ink of the present embodiment includes a urethane resin having crystallinity (also referred to as "crystalline urethane resin) as the resin, and may further optionally include other types of resins.

The other types of the resins are not particularly limited and can be suitably selected to suit to a particular application. Examples include, but are not limited to, polyester resins, acrylic-based resins, vinyl acetate-based resins, styrene-based resins, butadiene-based resins, styrene-butadiene-based resins, vinyl chloride-based resins, acrylic styrene-based resins, acrylic silicone-based resins, and non-crystalline (amorphous) urethane resins. These can be used alone or in combination.

Hereinafter, the crystalline urethane resin will be described in detail.

Crystalline Urethane Resin

The crystalline urethane resin has a crystalline portion and may have a non-crystalline portion. The crystallinity, molecular structure, and others of the crystalline urethane resin can be confirmed by existing technologies such as NMR measurement, differential scanning calorimeter (DSC) measurement, X-ray diffraction measurement, gas chromotography/mass spectrometer (GC/MS) measurement, liquid chromatography/mass spectrometry (LC/MS) measurement, and infrared absorption (IR) spectrum measurement. Further, crystallinity of the urethane resin is preferably determined based on whether the urethane resin has an endothermic peak and more preferably based on whether the urethane resin has a heat of fusion of 5 J/g or greater in the endothermic peak, when a sample is measured by a differential scanning calorimeter (DSC) under the measuring conditions described later. In addition, the crystalline portion of the crystalline urethane resin demonstrates high crystallinity. Therefore, it is preferably a polyester and more preferably an aliphatic polyester.

When the white ink is applied to a recording medium followed by drying by heating, an image is formed while the crystalline urethane resin is once melted or dissolved, thereby lowering viscosity of the crystalline urethane resin. Therefore, the contact area increases and attachability between the crystalline urethane resin and the recording medium is improved. As a result, scratch resistance is enhanced. Thereafter, the image is formed while the crystalline urethane resin is recrystallized. Therefore, light easily scatters on the image surface, and as a result, the degree of brightness is improved. In addition to the crystallization effect, due to the high toughness, which is a property of the urethane resin, the scratch resistance is improved. As described above, the use of the crystalline urethane resin enhances the degree of brightness, which reduces the proportion of the white coloring material in the white ink. As a result, sedimentation of the coloring material can be reduced.

The crystalline urethane resin preferably has at least one structure selected from a cross-linking structure and elongated structure as the structure in the resin. These structures are independently derived from a polyamine. Further, it is more preferable to have a cross-linking structure derived from triamine. When the crystalline urethane resin has at least one structure selected from a crosslinked structure and an elongated structure, the storage stability of the white ink is enhanced.

The crystalline urethane resin has an endothermic peak as measured using a differential scanning calorimeter (DSC) under the following measurement conditions. Specifically, the crystalline urethane resin preferably has a melting peak temperature (Tm) (hereinafter also simply referred to as "melting point") in the range of from 40 to 100 degrees C., more preferably in the range of from 40 to 70 degrees C., and furthermore preferably in the range of from 40 to 60 degrees C. When the melting point is from 40 to 100 degrees C., the crystalline urethane resin melts and forms a coating film in the drying by heating of the applied white ink so that the contact surface with the recording medium becomes large, thereby enhancing attachability of the image against the recording medium. Further, a dense coating film can be formed, thereby increasing the degree of brightness.

In other words, the urethane resin having an endothermic peak, to be specific, a melting peak (Tm) (hereinafter simply referred to as melting point) in the temperature range of from 40 to 100 degrees C. in the second temperature rising as measured by a differential scanning calorimeter (DSC) according to the following measuring conditions has crystallinity.

Measuring Conditions

A total of 4 g of the water liquid dispersion of the crystalline urethane resin or the white ink containing the crystalline urethane resin is placed in a container so as to spread uniformly therein. Next, it is dried at 70 degrees C. for 18 hours and at 120 degrees C. for 15 minutes to prepare solid matter of a measuring sample, Thereafter, the thermal properties of the measuring sample are measured by a differential scanning calorimeter (DSC) (Q2000, manufacture by TA Instruments) under the following conditions. A graph of quantity of endotherm and exotherm is created from the measuring results and the temperature at the top of the melting (endothermic) peak present during the second temperature rising is defined as the melting point.

Sample container: Aluminum sample pan (with a lid)
Quantity of sample: 5 mg
Reference: Aluminum sample pan (empty container)
Atmosphere: nitrogen (flow rate: 50 ml/min)

Starting Temperature: −20 degrees C.
Heating rate: 10 degrees C./min
Ending temperature: 130 degrees C.
Holding time: one minute
Cooling rate: −10 degrees C./min
Ending temperature: −50 degrees C.
Holding time: five minutes
Heating rate: 10 degrees C./min
Ending temperature: 130 degrees C.

The heat of fusion at the endothermic peak of the crystalline urethane resin is preferably from 0.5 to 50.0 J/g, more preferably from 1.0 to 40.0 J/g, and furthermore preferably from 2.0 to 30.0 J/g. When the heat of fusion is 0.5 J/g or greater, the degree of crystallinity at the crystalline portion is increased, so that the viscosity during the drying by heating is sufficiently lowered, and a decrease in the image attachability is reduced. In addition, when the heat of fusion is 50 J/g or less, the proportion of the crystalline portion in a resin does not increase too high, and a decrease in storage stability is reduced.

The crystallization peak temperature (crystallization temperature: Tc) of the crystalline urethane resin is preferably from −30 to 50 degrees C., more preferably from −20 to 30 degrees C., furthermore preferably from −20 to 20 degrees C., and particularly preferably from −20 to 0 degrees C. in the second cooling process. When the crystallization peak temperature is from −30 to 50 degrees C., the resin is melted and thereafter crystallized in the drying by heating of the applied white ink, so that a tough film can be formed, thereby enhancing scratch resistance.

In addition, the heat of fusion at the crystallization peak of the crystalline urethane resin is preferably from 0.5 to 50.0 J/g, more preferably from 1.0 to 40.0 J/g, and furthermore preferably from 2.0 to 30.0 J/g. When the heat of the crystallization is 0.5 J/g or greater, the crystallinity sufficiently demonstrates and the brightness of an image is improved. Further, when the heat is 50 J/g or less, the proportion of the crystalline portion in the crystalline urethane resin does not excessively increase, so that the storage stability of the white ink is enhanced.

The acid value of the crystalline urethane resin is preferably from 8 to 50 mgKOH/g and more preferably from 10 to 40 mgKOH/g. In this range, the self-emulsification property of the crystalline urethane resin in an aqueous medium is enhanced. Further, when the acid value is 8 mgKOH/g or greater, dispersion stability of the resin becomes good, and the white ink is uniformly filled with the resin to form a uniform film, thereby forming an image having excellent mechanical strength. When the acid value is 50 mgKOH/g or less, a film having excellent mechanical strength can be formed. In addition, the hydrophilicity of the resin is appropriate, so that water resistance is improved, and the resin contained in the white ink as resin particles is suitably stabilized.

The acid value of the crystalline urethane resin can be measured by placing the crystalline urethane resin in a tetrahydrofuran (THF) solution and titrating the same with a 0.1 M potassium hydroxide methanol solution and other methods.

The crystalline urethane resin is preferably a resin emulsion. The resin emulsion means a state in which resin particles are dispersed in an aqueous medium such as water or ink, and it does not matter whether the resin particles are solid or liquid. The aqueous medium and the aqueous ink contain water or a hydrophilic solvent as a component and may contain both water and a hydrophilic solvent.

Examples of a method of dispersing resin particles containing a crystalline urethane resin in water or an aqueous medium such as ink include, but are not limited to, a forced emulsification method using a dispersant and a self-emulsification method using a resin having an anionic group. A dispersant may remain in an image formed with the ink, thereby degrading the strength of the image in the forced emulsification method. Therefore, using the self-emulsification method is preferable.

Specific examples of the anionic group include, but are not limited to, a carboxyl group, carboxylate group, sulfonic acid group, and sulfonate group. Of these, it is preferable to use a carboxylate group or sulfonate group all or part, and in particular all of which is neutralized by a substance such as a basic compound.

Specific examples of neutralizing agents usable for neutralizing anionic groups include, but are not limited to, organic amines such as ammonium, triethylamine, pyridine, and morpholine, basic compounds such as alkanolamines such as monoethanolamine, and metal base compounds such as Na, K, Li, and Ca.

The mean volume diameter (volume average particle diameter) of the resin particle of the crystalline urethane resin is not particularly limited and can be suitably selected to suit to a particular application. The particle diameter (D50) meaning that the volume distribution frequency is 50 percent is preferably from 10 to 1,000 nm, more preferably from 10 to 200 nm, and furthermore preferably from 10 to 100 nm to obtain good fixability and image hardness.

The mean volume diameter can be measured by using an instrument such as a particle size analyzer (Nanotrac Wave-UT 151, manufactured by MicrotracBEL Corp.).

The method of manufacturing the resin emulsion is not particularly limited and a preferable example is a phase inversion emulsification method. For example, the anionic group in the crystalline urethane resin can be neutralized with a neutralizing agent under the absence of a solvent or the presence of an organic solvent and thereafter water is poured to disperse the crystalline urethane resin. Thereafter, optionally the organic solvent in the system is removed to obtain the resin emulsion.

Specific examples of the usable organic solvent include, but are not limited to, ketones such as acetone and methylethyl ketone, ethers such as tetrahydrofuran and dioxane, acetic acid esters such as ethyl acetate and butylacetate, nitriles such as acetonitrile, and amides such as dimethyl formamide, N-methyl pyrolidone, and 1-ethyl-2-pyrolidone. These can be used alone or in combination.

The proportion of the crystalline urethane resin is not particularly limited and can be suitably selected to suit to a particular application. In terms of fixability and storage stability of the white ink, it is preferably from 1 to 30 percent by mass and more preferably from 5 to 20 percent by mass of the total content of the white ink.

Method of Manufacturing Crystalline Urethane Resin

An example of a method of manufacturing the crystalline urethane resin is the following method.

First, a crystalline polymer polyol A, a short-chain polyhydric alcohol (B), a polyhydric alcohol (C) having an anionic group, and a polyisocyanate (D) are reacted under the absence of a solvent or the presence of an organic solvent to manufacture an isocyanate-terminated urethane prepolymer.

Next, the anionic group in the isocyanate-terminated urethane prepolymer is optionally neutralized with a neutralizing agent, and thereafter a polyamine (E) is added to form a urea bond formed between the terminal isocyanate group and the polyamine (E) so that the crystalline urethane resin can be elongated or cross-linked.

Specific examples of the usable organic solvent during the reaction include, but are not limited to, ketones such as acetone and methylethyl ketone, ethers such as tetrahydrofuran and dioxane, acetic acid esters such as ethyl acetate and butylacetate, nitriles such as acetonitrile, and amides such as dimethyl formamide, N-methyl pyrolidone, and 1-ethyl-2-pyrolidone.

These can be used alone or in combination.

The composition ratio of each material for use in the reaction is that [moles of (C)/(moles of (A)+moles of (B)+moles of (C))] is preferably from 0.15 to 0.5, more preferably from 0.2 to 0.5, and furthermore preferably from 0.25 to 0.4.

When the composition ratio is 0.5 or less, excessive hydrophilicity prevents an ink film from being significantly brittle, which prevents a decrease in water resistance of an image.

Further, the white ink can be prevented from being thickened caused by excessive miniaturization of the resin particles. Conversely, when the composition ratio is 0.15 or more, the dispersion stability of the resin particles is improved.

The composition ratio of each material for use in the reaction is that [equivalent number of (D)/(equivalent number of (A)+equivalent number of (B)+equivalent number of (C))] is preferably from 1.05 to 1.6, more preferably from 1.05 to 1.5, and furthermore preferably from 1.1 to 1.25.

When the composition ratio is in this range, a film can obtain excellent mechanical strength and form an image having excellent blocking resistance and scratch resistance.

Crystalline Polymer Polyol (A)

The crystalline polymer polyol (A) is preferably a crystalline polyester polyol and more preferably a crystalline polyester polyol having an aliphatic polyester segment. When the crystalline polymer polyol is a crystalline polyester polyol, it strongly demonstrates crystallinity of the crystalline urethane resin. These crystalline polymer polyol can be used alone or in combination.

The crystalline polymer polyol preferably has a hydroxyl value (OHV) of from 20 to 200 mgKOH/g, more preferably from 50 to 150 mgKOH/g, and even more preferably from 70 to 120 mgKOH/g.

When the hydroxyl value is within this range, the resin has good dispersion stability and demonstrates appropriate crystallinity, thereby obtaining a crystalline urethane resin capable of forming an image having excellent fixability.

The molecular weight of the crystalline polymer polyol is not particularly limited and can be suitably selected to suit to a particular application. In the GPC measurement, the weight average molecular weight (Mw) is preferably from 500 to 15,000, more preferably from 500 to 10,000, and furthermore preferably from 1,000 to 5,000.

When the weight average molecular weight is within this range, the resin has good dispersion stability and demonstrates appropriate crystallinity, thereby producing a crystalline urethane resin capable of forming an image having excellent fixability.

The melting point (Tm) of the crystalline polymer polyol is not particularly limited and can be suitably selected to suit to a particular application. Preferably, it is from 50 to 100 degrees C. The melting point can be measured by an endothermic peak value of the DSC chart in a differential scanning calorimeter (DSC) measuring. The crystallinity and molecular structure of the crystalline polyester can be confirmed by existing technologies such as NMR measurement, differential scanning calorimeter (DSC) measurement, X-ray diffraction measurement, gas chromotography/mass spectrometer (GC/MS) measurement, liquid chromatography/mass spectrometry (LC/MS) measurement, and infrared absorption (IR) spectrum measurement.

Next, an example of the method of manufacturing a crystalline polymer polyol will be described. The crystalline polymer polyol is preferably manufactured by reaction such as polycondensation of a polyhydric alcohol, a polycarboxylic acid, a polycarboxylic anhydride, a polycarboxylic acid such as a polycarboxylic acid ester and/or a derivative thereof under the absence of a solvent or the presence of an organic solvent. That is, the crystalline portion of the crystalline urethane resin is derived from an alcohol, a polycarboxylic acid and other substances for use in the production of the crystalline polymer polyol. The acid value of a crystalline polymer polyol such as a crystalline polyester polyol can be arbitrarily controlled. For example, the acid value can be imparted by reacting the obtained crystalline polymer polyol with a polyvalent carboxylic acid and/or a carboxylic anhydride.

Polyhydric Alcohol

The polyhydric alcohol is not particular limited and can be suitably selected to suit to a particular application. Examples include, but are not limited to, diol and tri- or higher alcohols.

Aliphatic diols are preferable and saturated aliphatic diols are more preferable.

Examples of the saturated aliphatic diol include, but are not limited to, linear saturated aliphatic diols and branched saturated aliphatic diols. Of these, straight-chain saturated aliphatic diols are preferable, and straight-chain saturated aliphatic diols having 2 to 12 carbon atoms are more preferable. When the saturated aliphatic diol is linear, crystallinity does not lower and the melting point does not easily lower. The number of carbon atoms of the saturated aliphatic diol is preferably 12 or less because it becomes easier to obtain a material.

Specific examples of the saturated aliphatic diol include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol. These can be used alone or in combination.

Specific examples of the alcohols having three or more hydroxyl groups include, but are not limited to, glycerin, trimethylol ethane, trimethylol propane, and pentaerythritol.

These can be used alone or in combination.

Polyvalent Carboxylic Acid

The polyvalent carboxylic acids are not particularly limited and can be suitably selected to suit to a particular application. Examples include, but are not limited to, divalent carboxylic acids and trivalent or higher carboxylic acids. Aliphatic dicarboxylic acids are preferable.

Specific examples of the dicarboxylic acids include, but are not limited to, saturated aliphatic dicarboxylic acids such as oxalic acid, succinic acid, glutaric acid, adipic acid, suberic acid, azelaic acid, sebacic acid, 1,9-nonane dicarboxylic acid, 1,10-decane dicarboxylic acid, 1,12-dodecane dicarboxylic acid, 1,14-tetradecane dicarboxylic acid, and 1,18-octadecane dicarboxylic acid; aromatic dicarboxylic acids such as phthalic acid, isophthalic acid, terephthalic acid, naphthalene-2,6-dicarboxylic acid, malonic acid, and mesaconic acid; and anhydrides or lower alkylesters (1 to 3 carbon atomes) thereof. These can be used alone or in combination.

Specific examples of the tri- or higher carboxylic acids include, but are not limited to, 1,2,4-benzene tricarboxylic acid, 1,2,5-benzene tricarboxylic acid, 1,2,4-naphtalene tricarboxylic acid, and their anhydrides or lower alkyl esters (1 to 3 carbon atoms). These can be used alone or in combination.

The polyvalent carboxylic acid may optionally contain a dicarboxylic acid having a sulfonic acid group and a dicarboxylic acid having a double bond in addition to the saturated aliphatic dicarboxylic acid and the aromatic dicarboxylic acid.

Short-Chain Polyhydric Alcohol (B)

Specific examples of the short-chain polyhydric alcohol include, but are not limited to, polyhydric alcohols having 2 to 15 carbon atoms such as ethylene glycol, propylene glycol, 1,4-butanediol, 1,5-pentanediol, neopentyl glycol, 1,6-hexanediol, 1,8-octanediol, 1,4-cyclohexane dimethanol, diethylene glycol, glycerin, and trimethylolpropane.

Polyhydric Alcohol (C) Having Anionic Group

The polyhydric alcohol having an anionic group is not particularly limited. Materials having two or more hydroxyl groups and functional group such as carboxylic acid or sulfonic acid as the anionic group can be used. Specific examples include, but are not limited to, carboxylic acid groups such as dimethylolpropionic acid, dimethylolbutanoic acid, dimethylolbutyric acid, dimethylolvaleric acid, trimethylolpropanoic acid and trimethylolbutanoic acid and a sulfonic acid such as 1,4-butanediol-2-sulfonic acid.

Polyisocyanate (D)

Specific examples of the polyisocyanate include, but are not limited to, 1,3-phenylene diisocyanate, 1,4-phenylene diisocyanate, 2,4-tolylene diisocyanate (TDI), 2,6-tolylene diisocyanate, and 4,4'-diphenylmethane diisocyanate (MDI), 2,4-diphenylmethane diisocyanate, 4,4'-dii socyanatobiphenyl, 3,3'-dimethyl-4,4'-dii socyanatobiphenyl, 3,3'-dimethyl-4,4'-diisocyanate phenyl methane, 1,5-naphthylene diisocyanate, 4,4'4''-triphenyl methane triisocyanate, m-isocyanatophenylsulfonyl isocyanate, p-isocyanatophenylsulfonyl isocyanate, aliphatic polyisocyanate compounds such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl)fumarate, bis (2-isocyanatoethyl)carbonate, 2-isocyanatoethyl-2,6-dii socyanatohexanoate, alicyclic polyisocyanate compounds such as isophorone diisocyanate (IPDI), 4,4'-dicyclohexylmethane diisocyanate (hydrogenated MDT), cyclohexylene diisocyanate, methyl cyclohexylene diisocyanate (hydrogenated TDI), bis (2-isocyanatoethyl)-4-diclohexene-1,2-dicarboxylate, 2,5-norbornane diisocyanate, and 2,6-norbornane diisocyanate. These can be used alone or in combination.

Of these, aliphatic polyisocyanate compounds and alicyclic polyisocyanate compounds are preferable, alicyclic polyisocyanate compounds are more preferable, and isophorone diisocyanate and 4,4'-dicyclohexylmethane diisocyanate are particularly preferable.

Polyamine (E)

Specific examples of polyamine include, but are not limited to, diamines such as ethylene diamine, 1,2-propane diamine, 1,6-hexamethylene diamine, piperazine, 2,5-dimethyl piperazine, isphorone diamine, 4,4'-dicyclohexyl methane diamine, and 1,4-cyclohexane diamine, polyamines such as diethylene triamine, dipropylene triamine, and triethylene tetramine, hydrazines such as N,N'dimethyl hydrazine and 1,6-hexamethylene bis hydrazine, and dihydrazides such as succinic dihydrazide, adipic acid dihydrazide, glutaric acid dihydrazide, sebacic acid dihydrazide, and isophthalic acid dihydrazide.

Content of Urethane Group of Crystalline Urethane Resin

The white ink of the present embodiment can form a tough film having excellent strength and elongation and an image having excellent scratch resistance due to the high cohesive force attributable to the hydrogen bond of the urethane group by increasing the proportion of the urethane group in the polyurethane segment of the crystalline urethane resin contained in the white ink. The proportion of the urethane group can be calculated according to the following relationship 1 and others. In the following relationship 1, the compound having a hydroxyl group means a compound having a hydroxyl group of the compounds as material for use in manufacturing the crystalline urethane resin.

Proportion of urethane group=(total number of mols of compound having hydroxyl group)/(total mass of solid content of urethane resin)×100   Relationship 1

Cross-Linking in Crystalline Urethane Resin

The crystalline urethane resin preferably has a chemical cross linking derived from a covalent bond in its molecular structure in addition to the hydrogen bond, which is one of the original features. Due to this chemical cross-linking derived from the covalent bond, the crystalline urethane resin has an excellent mechanical strength, which makes it possible to obtain a final image having excellent scratch resistance.

Examples of the method of introducing chemical cross-linking include, but are not limited to, increasing the number of functional groups of the crystalline polymer polyol to more than 2, using a trifunctional or higher functional short-chain polyhydric alcohol, and using a trifunctional or higher polyisocyanate, and using a polyamines (triamine) having three or more functional groups. Any of the methods of introducing a chemical cross-linking may be used alone or in combination. Any of the methods of introducing chemical cross-linking can be suitably used. The method of increasing the number of functional groups of the crystalline polymer polyol to more than 2 and the method of using a polyamines (triamine) having three or more functional groups. The number of functional groups of the crystalline polymer polyol is preferably from more than 2 to 2.5 and more preferably from 2.02 to 2.15. In this range, a crystalline urethane resin has an excellent mechanical strength and forms an image having an excellent scratch resistance. The number of functional groups of the crystalline polymer polyol can be increased than two due to the combinational use of a crystalline polymer polyol having two functional groups and a crystalline polymer polyol having three or more functional groups. The number of functional groups in the entire crystalline polymer polyol can be calculated according to the following relationship 2 when a crystalline polymer polyol having two functional groups and a crystalline polymer polyol having three or more functional groups are used in combination.

Number of functional groups of crystalline polyester polyol=$2 \times a + b \times (1-a)$.   Relationship 2

In the relationship 2, a represents the mass ratio of the crystalline polymer polyol having two functional groups to the entire crystalline polymer polyol represented by the following relationship 3, b represents the number of functional groups of the crystalline polymer polyol having three or more functional groups, and 2 means number of functional groups of the crystalline polymer polyol having two functional groups.

$$a=c/(c+d) \quad \text{Relationship 3}$$

In the relationship 3, c represents the mass of the crystalline polymer polyol having two functional groups, and d represents the mass of the crystalline polymer polyol having three or more functional groups. The crystalline polymer polyol having three or more functional groups is preferably a crystalline polymer polyol having three functional groups.

Coloring Material

The coloring material has a white color and includes substances such as inorganic pigments, inorganic hollow particles, and resin hollow particles Of these, the inorganic pigment is preferable.

Specific examples of the inorganic pigment include, but are not limited to, metal oxide, calcium carbonate, barium sulfate, and aluminum hydroxide and titanium oxide is preferable. Specific examples of the metal oxide include, but are not limited to, titanium oxide, zinc oxide, silica, alumina, and magnesium oxide. Of these, titanium oxide is preferable.

The proportion of the coloring material is preferably from 0.1 to 15 percent by mass and more preferably from 1 to 10 percent by mass of the total content of the white ink in terms of image density, fixability, and discharging stability.

An inorganic pigment such as titanium oxide having a large specific gravity has a problem of a coloring material sedimenting quickly. In order to reduce the sedimentation of a coloring material, the proportion of the coloring material in the white ink can be reduced. However, this causes another problem of degradation of the brightness by the white ink. However, due to the combinational use with the crystalline urethane resin capable of improving the brightness with a coloring material, the brightness can be enhanced while the proportion of the coloring material in the white ink is reduced to slow down the sedimentation.

Examples of methods of dispersing a coloring material to obtain the white ink include, but are not limited to, a method of introducing a hydrophilic functional group into a coloring material to prepare a self-dispersible pigment, a method of coating the surface of a pigment with a resin followed by dispersion, and a method of using a dispersant for dispersion.

The hydrophilic group can be introduced into a coloring material to prepare a self-dispersible pigment by adding a functional group such as sulfone group and carboxyl group to the coloring material to disperse the coloring material in water.

To coat the surface of a coloring material with a resin, the coloring material is encapsulated by microcapsules to make it dispersible in water. This can be referred to as a resin-coated pigment. In this case, all the coloring material to be added to the white ink are not necessarily entirely coated with a resin. Uncoated or partially covered coloring material with a resin may be dispersed in the white ink.

A known dispersant of a small molecular weight or a large molecular weight, which is represented by a surfactant, can be used to disperse the coloring material in the white ink.

As the dispersant, it is possible to use surfactants such as an anionic surfactant, a cationic surfactant, a nonionic surfactant, and an amphoteric surfactant depending on the coloring material.

Also, a nonionic surfactant (RT-100, manufactured by TAKEMOTO OIL & FAT CO., LTD.) and a formalin condensate of naphthalene sodium sulfonate are suitably used as the dispersant.

Those can be used alone or in combination.

Dispersion

It is also possible to mix a coloring material with a substance such as water and a dispersant to prepare a dispersion and thereafter mix the dispersion with materials such as water and an organic solvent to manufacture the white ink. The dispersion is obtained by mixing and dispersing water, a coloring material, a dispersant, and other optional components and controlling the particle size. It is good to use a dispersing device for dispersion.

The particle size of the coloring material in the dispersion is not particularly limited. The maximum frequency in the maximum number conversion is preferably from 100 to 800 nm and more preferably from 200 to 600 nm. When the particle size is 100 nm or greater, the brightness is improved and when the particle size is 800 nm or less, sedimentation can be diminished. The particle diameter of a coloring material can be measured using a particle size analyzer (Nanotrac Wave-UT 151, manufactured by MicrotracBEL Corp).

In addition, the proportion of the coloring material in the dispersion is not particularly limited and can be suitably selected to suit a particular application. In terms of enhancing discharging stability and image density, the proportion is preferably from 0.1 to 50 percent by mass and more preferably from 0.1 to 30 percent by mass.

It is preferable that the dispersion be filtered with a filter, a centrifuge, or other. to remove coarse particles followed by deaerating.

Organic Solvent

The organic solvent is not particularly limited and water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples of polyols include, but are not limited to, ethylene glycol, diethylene glycol, 1,2-propanediol, 1,3-propanediol, 1,2-butanediol, 1,3-butanediol, 1,4-butane diol, 2,3-butanediol, 3-methyl-1,3-butanediol, triethylene glycol, polyethylene glycol, polypropylene glycol, 1,2-pentanediol, 1,3-pentanediol, 1,4-pentanediol 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrolidone, N-methyl-2-pyrrolidone, N-hydroxyethyle-2-pyrrolidone, 1,3-dimethylimidazoline, ε-caprolactam, and γ-butylolactone.

Specific examples of the amide include, but are not limited to, formamide, N-methylformamide, N,N-dimethylformamide, 3-methoxy-N,N-dimethyl propionamide, and 3-butoxy-N,N-dimethyl propionamide.

Specific examples of amines include, but are not limited to, monoethanolamine, diethanolamine, and triethylamine.

Specific examples of the sulfur-containing compounds include, but are not limited to, dimethyl sulphoxide, sulfolane, and thiodiethanol.

Specific examples of the other organic solvents include, but are not limited to, propylene carbonate and ethylene carbonate.

It is preferable to use an organic solvent having a boiling point of 250 degrees C. or lower to serve as a humectant and impart a good drying property.

Polyol compounds having eight or more carbon atoms and glycol ether compounds are also suitably used as the organic solvent. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycol ether compounds enhance permeability of the white ink when paper is used as a recording medium.

The proportion of the organic solvent in white ink has no particular limit and can be suitably selected to suit to a particular application.

In terms of the drying property and discharging reliability of the white ink, the proportion is preferably from 10 to 60 percent by mass and more preferably 20 to 60 percent by mass of the total mass of the white ink.

Water

The proportion of water in the white ink is not particularly limited and can be suitably selected to suit to a particular application. In terms of the drying property and discharging reliability of the white ink, the proportion is preferably from 10 to 90 percent by mass and more preferably from 20 to 60 percent by mass of the total amount of the white ink.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

In particular, silicone-based surfactants which do not decompose even at a high pH are preferable.

Specific examples of the silicone-based surfactant include, but are not limited to, side-chain modified polydimethyl siloxane, both-terminal modified polydimethyl siloxane, one-terminal-modified polydimethyl siloxane, and side chain both-terminal modified polydimethyl siloxane. Silicone-based surfactants having a polyoxyethylene group or polyoxyethylene polyoxypropylene group as the modification group are particularly preferable because these demonstrate good properties as aqueous surfactants. It is possible to use a polyether-modified silicone-based surfactant as the silicone-based surfactant. A specific example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams. Specific examples of the perfluoroalkyl carboxylic acid compounds include, but are not limited to, perfluoroalkyl carboxylic acid and salts of perfluoroalkyl carboxylic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application.

Specific examples thereof include, but are not limited to, side-chain-modified polydimethyl siloxane, both distal-end-modified polydimethylsiloxane, one-distal-end-modified polydimethyl siloxane, and side-chain-both-distal-end-modified polydimethyl siloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., and others.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

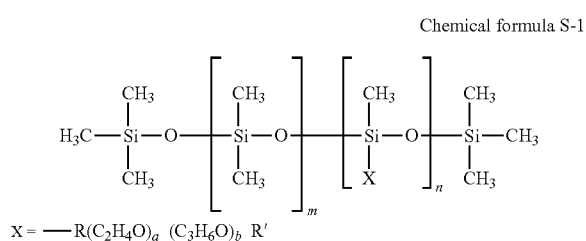

Chemical formula S-1

In the Chemical formula S-1, "m", "n", "a", and "b" each, respectively independently represent integers, R represents an alkylene group, and W represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is from 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

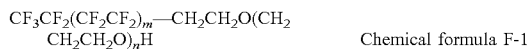

Chemical formula F-1

In the Chemical formula. F-1, "m" is preferably 0 or an integer of from 1 to 10 and "n" is preferably 0 or an integer of from 1 to 40.

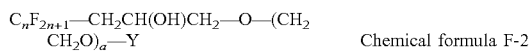

Chemical formula F-2

In the compound represented by the chemical formula F-2, Y represents H or $C_mF_{2m+1}$, where n represents an integer of from 1 to 6, or $CH_2CH(OH)CH_2-C_mF_{2m+1}$, where m represents an integer of from 4 to 6, or $C_pH_{2p+1}$, where p is an integer of from 1 to 19. "n" represents an integer of from t to 6. "a" represents an integer of from 4 to 14.

As the fluorochemical surfactant, products available on the market may be used. Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW ofNEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably from 0.001 to 5 percent by mass and more preferably from 0.05 to 5 percent by mass of the total amount of the white ink in terms of enhancement of wettability and discharging stability and improvement on image quality.

Defoaming Agent

The defoaming agent has no particular limit and examples thereof include, bt are not limited to silicon-based defoaming agents, polyether-based defoaming agents, and aliphatic acid ester-based defoaming agents. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has no particular limitation. Examples are acid sulfites and sodium thiosulfates.

pH Regulator

The pH regulator has no particular limit. It is preferable to adjust the pH to be from 7 or higher. Specific examples include, but are not limited to, amines such as diethanol amine and triethanol amine.

Method of Manufacturing White Ink

An example of the method of manufacturing the white ink is dispersing or dissolving water, a coloring material, a resin, and other components in an aqueous medium followed by stirring and mixing. A sand mill, a homogenizer, a ball mill, a paint shaker, an ultrasonic dispersion, or others can be used for dispersion. A stirrer using a normal stirring blade, a magnetic stirrer, a high performance disperser can be used for the mixing and stirring.

Recording Medium

The recording medium is not particularly limited. Plain paper, gloss paper, special paper, cloth, and others are usable. Non-permeable substrates are preferable. If the recording medium is a non-permeable substrate, scratch resistance of an image formed with a white ink tends to be inferior. Therefore, the effect obtained by the use of the white ink of the present embodiment becomes large.

The non-permeable substrate has a surface with poor moisture permeability, absorbency, and/or adsorptive property and includes a substrate having many hollow spaces inside that are not open to the outside. To be more quantitative, the substrate has a water-absorbency of 10 mL/m² or less between the initiation of contact and 30 msec$^{1/2}$ later according to Bristow's method.

Specific examples of the non-permeable substrates include, but are not limited to, vinyl chloride films, polypropylene films, polyethylene terephthalate films, nylon films, and synthetic paper.

Specific examples of the polypropylene film include, but are not limited to, P-2002, P-2161, and P-4166, all manufactured by TOYOBO CO., LTD., PA-20, PA-30, and PA-20W, all manufactured by SunTox Co., Ltd., FOA, FOS, and FOR, all manufactured by FUTAMURA CHEMICAL CO., LTD.

Specific examples of the polyethylene terephthalate film include, but are not limited to, E-5100 and E-5102, both manufactured by TOYOBO CO., LTD., P60 and P375, both manufactured by Toray Industries, Inc., and G2, G2P2, K, and SL, all manufactured by Teijin Dupont Film Japan Limited.

Specific examples of the nylon film include, but are not limited to, Harden films N-1100, N-1102, and N-1200, all manufactured by TOYOBO CO., LTD. and ON, NX, MS, and NK, all manufactured by UNITIKA LTD.

Specific examples of the synthetic paper include, but are not limited, to, FPU130, FPU200, FPU250, and VJFP120, all manufactured by Yupo Corporation.

Recorded Matter

The recorded matter has a recording medium and a white printing layer formed on the recording medium with the white ink of the present embodiment. The print layer is formed by applying and drying the white ink of the present embodiment and therefore contains the crystalline urethane resin and the coloring material mentioned above.

Ink Accommodating Container

The ink accommodating container of the present disclosure contains the ink of the present disclosure and includes an ink accommodating unit containing the ink of the present disclosure and other optional suitably-selected members.

The ink accommodating container is not particularly limited. Any form, any structure, any size, and any material can be suitably selected to a particular application. For example, a container having an ink accommodating unit made of aluminum laminate film, a resin film, or other is suitable.

Recording Device and Recording Method

The white ink of the present embodiment can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

The recording device and the recording method respectively represent a device capable of discharging ink, various processing fluids, and others to a recording medium and a method of recording on the recording medium utilizing the recording device. The recording medium means a product to which ink or various processing fluids can be attached even temporarily.

The recording device may further optionally include a device relating to feeding, conveying, and ejecting the recording medium and other devices referred to as a pre-processing device, a post-processing device, etc. in addition to the head portion to discharge the white ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with the white ink. For example, the recording method and the recording device capable of producing patterns like geometric design and 3D images are included.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as recording media.

Figure 2:
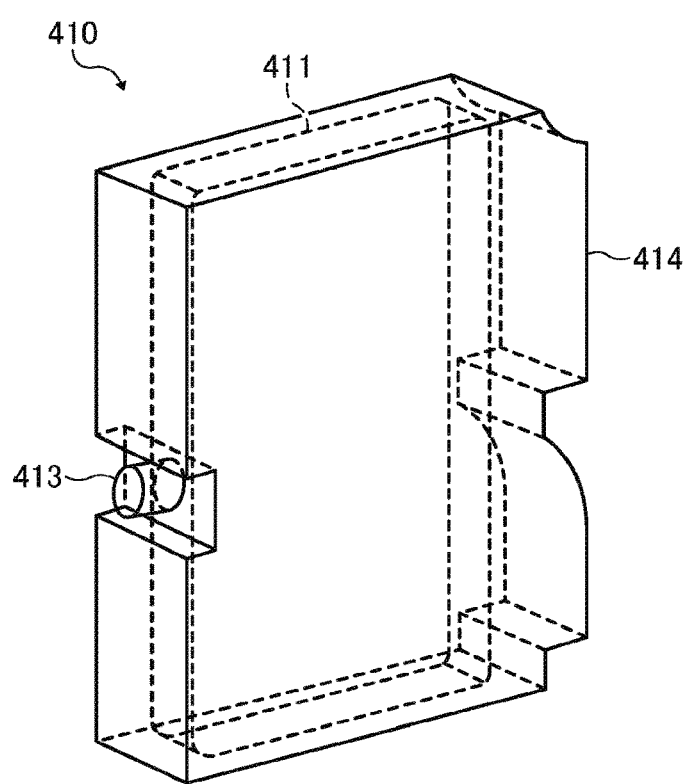
FIG. 2 is a diagram illustrating a perspective view of an example of a tank of the recording device.

The recording (print) device is described using an example with reference to FIG. 1 and FIG. 2. FIG. 1 is a diagram illustrating a perspective view of the recording device. FIG. 2 is a diagram illustrating a perspective view of a tank. An image forming apparatus 400 as an embodiment of the recording device is a serial type image forming apparatus. A mechanical unit 420 is disposed in an exterior 401 of the image forming apparatus 400. Each ink accommodating unit (ink container) 411 of each tank 410 (410*w*, 410*c*, 410*m*, and 410*y*) for each color of white (W), cyan (C), magenta (M), and yellow (Y) is made of a packaging member such as aluminum laminate film. The ink accommodating unit 411 is accommodated in, for example, a plastic container housing unit 414. As a result, the tank 410 is used as an ink cartridge of each color.

A cartridge holder 404 is disposed on the rear side of the opening when a cover 401*c* is opened. The cartridge holder 404 is detachably attached to the tank 410. As a result, each ink discharging outlet 413 of the tank 410 communicates with a discharging head 434 for each color via a supplying tube 436 for each color so that the ink can be discharged from the discharging head 434 to a recording medium.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

Application Field

The usage of the white ink of the present embodiment is not particularly limited and can be suitably selected to suit to a particular application. For example, the white ink can be used for printed matter, a paint, a coating material, and foundation. The white ink can be also used to form two-dimensional texts and images and furthermore a three-dimensional solid object (3D modeling object) as a material for 3D modeling.

An apparatus for solid freeform fabrication to fabricate a three-dimensional solid object can be any known device with no particular limit. For example, the apparatus includes a white ink container, a supplying device, and a discharging device, a drier, and others. The three-dimensional solid object includes an object manufactured by repeatedly coating the white ink in an overlapping manner. In addition, the three-dimensional solid object can be manufactured by processing a structure having a substrate such as a print medium to which the white ink is applied as a molded processed product. The molded processed product is fabricated from printed matter or a structure having a sheet-like form, film-like form, and others by heating drawing, punching, or else.

The molded processed product is suitably used for products molded after surface-decorating. Examples thereof include, but are not limited to, gauges or operation panels of vehicles, office machines, electric and electronic devices, and cameras.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto. In the following description, "parts" means "parts by mass" unless otherwise specified, and "percent" means "percent by mass" unless otherwise specified.

First, the method of measuring properties described in Synthesis Examples, Manufacturing Examples, Preparation Examples, Examples, and Comparative Examples are described.

Molecular Weight

Device: GPC (manufactured by TOSOH CORPORATION,

Detector: RI, measuring temperature: 40 degrees C.

Mobile phase: Tetrahydrofuran, flow rate: 0.45 mL/min.

The number average molecular weight (Mn), weight average molecular weight (Mw), and molecular weight distribution (Mw/Mn) are each measured by gel permeation chromatography (GPC) using a calibration curve prepared based on a polystyrene sample having a known molecular weight as a standard. The column was composed of those having an exclusion limit of 60,000, 20,000, and 10,000, which were serially connected.

Melting point (Tm), Crystallization Temperature (Tc), and Glass Transition Temperature (Tg)

Four grams of the resin liquid dispersion (resin emulsion) was placed in a container so as to spread evenly and was dried at 70 degrees C. for 18 hours and thereafter at 120 degrees C. for 15 minutes to obtain a solid of a measuring sample.

The thermal properties of the measuring sample were measured by a differential scanning calorimeter (DSC) (Q2000, manufactured by TA Instruments) under the following conditions. Specifically, they were measured as follows:

Measuring Conditions
Sample container: Aluminum sample pan (with a lid);
Quantity of sample: 5 mg;
Reference: Aluminum sample pan (empty container);
Atmosphere: nitrogen (flow rate: 50 ml/min);
Starting temperature: −20 degrees C.;
Temperature rising rate: 10 degrees C./min;
Ending temperature: 130 degrees C.;
Holding time: 1 minute;
Temperature falling rate: 10 degrees C./min;
Ending temperature: −50 degrees C.;
Holding time: 5 minutes
Temperature rising rate: 10 degrees C./min;
Ending temperature: 130 degrees C.

The sample was measured under these measuring conditions and a graph of endothermic and exothermic amount and temperature was created.

The temperature at the melting (endothermic) peak present in the second temperature rising process was defined as the melting point (Tm), the temperature at the crystallization (exothermic) peak present in the second temperature falling process was defined as the crystallization temperature (Tc), and the characteristic inflection present in the first temperature rising process was defined as the glass transition temperature (Tg). In addition, the values obtained by the midpoint method from the DSC curve were used.

Mean Volume Diameter (Volume Average Particle Diameter)

The mean volume diameter was measured by a dynamic light scattering method using a zeta potential particle size measuring system (ELSZ-1000, manufactured by OTSUKA ELECTRONICS Co., LTD.).

First, 0.2 g of a resin liquid dispersion (resin emulsion) was taken, and thereafter diluted 20 times with deionized water. The thus-obtained solution was partially placed in a quartz cell, which was set in a sample holder. Thereafter, the mean volume diameter of the solid content was obtained under the conditions of temperature of 25 degrees C., dust cut (5 times, Upper: 5, Lower: 100), and cumulative number of times: 70.

Synthesis Example of Crystalline Polyester Polyol a

Butanediol as a diol and dodecane diacid as a dicarboxylic acid were placed in a 2-L four-necked flask equipped with a nitrogen introducing tube, a dehydrating tube, a stirrer, and a thermocouple in such a manner that OH/COOH=1.4. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the resulting substance was reacted under a reduced pressure of 10 mmHg to 30 mmHg for four hours to obtain a crystalline polyester polyol a as a crystalline polymer polyol.

The thus-obtained resin had an acid value (AV) of 2.2 mg KOH/g, a hydroxyl value (OHV) of 113 mg KOH/g, a melting point (Tm) of 67.0 degrees C., a crystallization temperature (Tc) of 54 degrees C., and a weight average molecular weight (Mw) of 4,600.

Synthesis Example of Crystalline Polyester Polyol b

Butanediol as a diol and sebacic acid as a dicarboxylic acid were placed in a 2-L four-necked flask equipped with a nitrogen introducing tube, a dehydrating tube, a stirrer, and a thermocouple in such a manner that OH/COOH=1.4. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the resulting substance was reacted under a reduced pressure of 10 mmHg to 30 mmHg for four hours to obtain a crystalline polyester polyol b as a crystalline polymer polyol.

The thus-obtained resin had an acid value (AV) of 2.3 mg KOH/g, a hydroxyl value (OHV) of 86 mg KOH/g, a melting point (Tm) of 66.0 degrees C., a crystallization temperature (Tc) of 47 degrees C., and a weight average molecular weight (Mw) of 3,900.

Synthesis Example of Crystalline Polyester Polyol c

An adduct of bisphenol A with EO as a diol and isophthalic acid as a dicarboxylic acid were placed in a 2-L four-necked flask equipped with a nitrogen introducing tube, a dehydrating tube, a stirrer, and a thermocouple in such a manner that OH/COOH=1.35. Subsequent to sufficient replacement with nitrogen gas in the reaction vessel, 300 ppm (based on the monomer) of titanium tetraisopropoxide was added, and the temperature was raised to 200 degrees C. in about four hours in a nitrogen atmosphere. Thereafter, the temperature was raised to 230 degrees C. over two hours to continue the reaction until no effluent was produced. Thereafter, the resulting substance was reacted for five hours with a reduced pressure of 10 to 15 mm Hg to obtain an aromatic-containing polyester c.

The thus-obtained resin had an acid value (AV) of 0.6 mg KOH/g, a hydroxyl group (OHV) of 84 mg KOH/g, a glass transition temperature (Tg) of 45 degrees C., and a weight average molecular weight (Mw) of 3,400.

Manufacturing Example of Crystalline Polyurethane Resin Emulsion A

A total of 50 g of crystalline polyester polyol a, 2.9 g of 2,2-bis (hydroxymethyl) propionic acid, and 23.5 g of 4,4'-dicyclohexylmethane diisocyanate, 2.2 g of triethylamine, and 41 g of acetone as an organic solvent were placed in a 1 L separable flask equipped with a stirrer, a thermometer, and a reflux tube, while nitrogen was being introduced. A single drop of a catalyst (tin(II)di(2-ethylhexanoate)) was added and thereafter the temperature was raised to 60 degrees C. followed by refluxing for two hours to obtain a crystalline polyurethane resin solution having an NCO percent of 0.8 percent, and a weight average molecular weight (Mw) of 11,800 at a solid content of 65 percent.

After the temperature of the resin solution was raised to 40 degrees C., 146 g of water was slowly added to form fine particles while the resin solution was stirred at 500 rpm followed by heating and stirring for 30 minutes. Thereafter, 0.63 g of diethylenetriamine was added followed by heating and stirring for two hours. Finally, acetone was removed to obtain a crystalline polyurethane resin emulsion A having a volume average particle size (D50) of 42 nm at a solid content of 30 percent.

The thus-obtained resin emulsion was dried to obtain a resin, which had a melting point (Tm) of 44.5 degrees C. and a crystallization temperature (Tc) of −2.4 degrees C.

Manufacturing Example of Crystalline Polyurethane Resin Emulsion B

A total of 50 g of crystalline polyester polyol b, 2.76 g of 2,2-bis (hydroxymethyl) propionic acid, and 19.3 g of 4,4'-dicyclohexylmethane diisocyanate, 2.09 g of triethylamine, and 39 g of acetone as an organic solvent were placed in a 1 L separable flask equipped with a stirrer, a thermometer, and a reflux tube, while nitrogen was being introduced. A single drop of a catalyst (tin(II)di(2-ethylhexanoate)) was added and thereafter the temperature was raised to 60 degrees C. followed by refluxing for two hours to obtain a crystalline polyurethane resin solution having an NCO percent of 0.4 percent, and a weight average molecular weight (Mw) of 12,700 at a solid content of 65 percent.

After the temperature of the resin solution was raised to 40 degrees C., 138 g of water was slowly added to form fine particles while the resin solution was stirred at 500 rpm followed by heating and stirring for 30 minutes. Thereafter, 0.33 g of diethylenetriamine was added followed by heating and stirring for two hours. Finally, acetone was removed to obtain a crystalline polyurethane resin emulsion B having a volume average particle size (D50) of 34 nm at a solid content of 30 percent.

The thus-obtained resin emulsion was dried to obtain a resin, which had a melting point (Tm) of 42.5 degrees C. and a crystallization temperature (Tc) of −19.0 degrees C.

Manufacturing Example of Crystalline Polyurethane Resin Emulsion C

A total of 50 g of crystalline polyester polyol a, 2.89 g of 2,2-bis (hydroxymethyl) propionic acid, and 23.5 g of 4,4'-dicyclohexylmethane diisocyanate, 2.18 g of triethylamine, and 41 g of acetone as an organic solvent were placed in a 1 L separable flask equipped with a stirrer, a thermometer, and a reflux tube, while nitrogen was being introduced. A single drop of a catalyst (tin(II)di(2-ethylhexanoate)) was added and thereafter the temperature was raised to 60 degrees C. followed by refluxing for two hours to obtain a crystalline polyurethane resin solution having an NCO percent of 0.8 percent, and a weight average molecular weight (Mw) of 10,500 at a solid content of 65 percent.

After the temperature of the resin solution was raised to 40 degrees C., 146 g of water was slowly added to form fine particles while the resin solution was stirred at 500 rpm followed by heating and stirring for 30 minutes. Thereafter, 1.56 g of isophorone diamine was added followed by heating and stirring for two hours. Finally, acetone was removed to obtain a crystalline polyurethane resin emulsion C having a volume average particle size (D50) of 44 nm at a solid content of 30 percent.

The thus-obtained resin emulsion was dried to obtain a resin, which had a melting point (Tm) of 48.2 degrees C. and a crystallization temperature (Tc) of −1.4 degrees C.

Manufacturing Example of Crystalline Polyurethane Resin Emulsion D

A total of 40 g of crystalline polyester polyol a, 2.10 g of 2,2-bis (hydroxymethyl) propionic acid, and 10.3 g of 4,4'-dicyclohexylmethane diisocyanate, 1.58 g of triethylamine, and 28 g of acetone as an organic solvent were placed in a 1 L separable flask equipped with a stirrer, a thermometer, and a reflux tube, while nitrogen was being introduced. A single drop of a catalyst (tin(II)di(2-ethylhexanoate)) was added and thereafter the temperature was raised to 60 degrees C. followed by refluxing for two hours to obtain a crystalline polyurethane resin solution having an NCO percent of 0 percent, and a weight average molecular weight (Mw) of 16,500 at a solid content of 65 percent.

After the temperature of the resin solution was raised to 40 degrees C., 100 g of water was slowly added to form fine particles while the resin solution was stirred at 500 rpm followed by heating and stirring for two hours. Finally, acetone was removed to obtain a crystalline polyurethane resin emulsion D having a volume average particle size (D50) of 57 nm at a solid content of 30 percent.

The thus-obtained resin emulsion was dried to obtain a resin, which had a melting point (Tm) of 64.0 degrees C. and a crystallization temperature (Tc) of 46.0 degrees C.

Manufacturing Example of Non-Crystalline Polyurethane Resin Emulsion E

A total of 140 g of non-crystalline polyester polyol c, 10.18 g of 2,2-bis(hydroxymethyl) propionic acid, and 64 g of 4,4'-dicyclohexylmethane diisocyanate, 6.53 g of triethylamine, and 115 g of acetone as an organic solvent were placed in a 1 L separable flask equipped with a stirrer, a thermometer, and a reflux tube, while nitrogen was being introduced. A single drop of a catalyst (tin(II)di(2-ethylhexanoate)) was added and thereafter the temperature was raised to 60 degrees C. followed by refluxing for two hours to obtain a crystalline polyurethane resin solution having an NCO percent of 1.6 percent, and a weight average molecular weight (Mw) of 15,500 at a solid content of 65 percent.

After the temperature of the resin solution was raised to 40 degrees C., 410 g of water was slowly added to form fine particles while the resin solution was stirred at 500 rpm followed by heating and stirring for 30 minutes. Thereafter, 4.25 g of diethylenetriamine was added followed by heating and stirring for two hours. Finally, acetone was removed to obtain a non-crystalline polyurethane resin emulsion E having a volume average particle size (D50) of 170 nm at a solid content of 30 percent.

The thus-obtained resin emulsion was dried to obtain a resin, which had a glass transition temperature of 70.0 degrees C.

Preparation Example of White Ink

Example 1

The white ink was prepared by mixing and stirring the following formulation and pH was controlled to 9 followed by filtering with a membrane filter having an average pore diameter of 5 μm to prepare Ink 1.
Titanium oxide pigment liquid dispersion (AC-RW7, manufactured by Dainichiseika Color and Chemicals Mfg. Co., LTD.): 4.3 percent by mass as solid content
Crystalline Polyurethane Resin Emulsion A: 8.1 percent by mass
Diethylene glycol monoethyl ether: 15.0 percent by mass
Propylene glycol: 14.0 percent by mass
3-methoxy-N,N-dimethyl propionamide: 5.0 percent by mass
2-ethyl-1,3-hexane diol: 2.0 percent by mass
Silicone-based surfactant (L-7002, manufactured by Dow Corning Toray Co., Ltd.): 1.0 percent by mass
Fluorochemical surfactant (MegaFace F-444, manufactured by DIC Corporation): 1.0 percent by mass
Preservatives and fungicides PROXEL LV (manufactured by AVECIA GROUP): 0.05 percent by mass
pH regulator (triethanolamine): 0.3 percent by mass
Water: balance (total: 100 percent by mass)

Examples 2 to 4 and Comparative Example 1

As seen in Table 1, the inks 2 to 5 were prepared in the same manner as in Example 1 except that the crystalline polyurethane resin emulsion A was replaced with the crystalline polyurethane resin emulsions B to D and the non-crystalline polyurethane resin emulsion E. In addition, the proportion of the titanium oxide shown in Table 1 is a value as a solid content, and represented in percent by mass.

Comparative Example 2

As seen in Table 1, the ink 6 was prepared in the same manner as in Example 1 except that the non-crystalline polyurethane resin emulsion E was used in place of the crystalline polyurethane resin emulsion A, and the titanium oxide pigment dispersion was used at 8.5 percent by mass as a solid content. In addition, the proportion of the titanium oxide shown in Table 1 is a value as a solid content, and represented in percent by mass.

Next, the degree of brightness, scratch resistance, poor sedimentation property, and storage stability of each of the prepared white inks were evaluated as follows. The results are shown in Table 1.

Degree of Brightness

The exterior of an inkjet printer (IPSiOGXe5500, manufactured by Ricoh Company Ltd.) was removed and multiple bypass feeders were mounted on the rear side. Pure water as rinsing liquid was caused to sufficiently flow in the ink supplying passage including the print head until the rinsing liquid was not colored. Thereafter, the rinsing liquid was completely evacuated from the device to prepare a device for evaluation. In addition, the prepared white ink was stirred for 30 minutes under a reduced pressure of 5 to 10 Pa to deaerate the ink to be evaluated. An ink cartridge was filled with the ink to prepare an ink cartridge for evaluation. Subsequent to filling operation, it was confirmed that all the nozzles were filled with the ink to be evaluated and no defective images were produced. Gloss and beautiful mode was selected by a driver installed onto the printer and thereafter color matching off was determined as print mode at the user setting. The discharging amount was controlled in this mode by changing the drive voltage of the head in order that the attached amount of the white ink of a solid image on a recording medium was 20 g/m². With the inkjet printer set under the printing conditions mentioned above, a 10 cm square solid image was printed at 1200×1200 dpi on a transparent PET film (ester film E5100, manufactured by TOYOBO CO., LTD.) and dried by heating at 70 degrees C. on a hot plate for three minutes.

Next, black paper was placed under the film on which the solid image was printed and L*, a*, and b* were measured by a spectrophotometer/colorimeter (X-rite 939) from the surface side of the solid image. The brightness by Hunter was calculated based on the following relationship. Brightness by Hunter is defined in JIS P8123 and L*, a*, b* are a color display method defined by the International Commission on Illumination (CIE). Grade B or higher is preferable.

$$\text{Brightness by Hunter} = 100 - [(100 - L^*)^2 + (A^{*2} + B^{*2})]^{0.5}$$

Evaluation Criteria
A: Brightness by Hunter is 70 or more
B: Brightness by Hunter is 60 to less than 70
C: Brightness by Hunter is less than 60
Scratch Resistance First, a solid image was printed under the same conditions as the solid image printed when the brightness mentioned above was measured.

Next, quantitative filter paper (No. 5A, manufactured by Toyo Roshi Kaisha, Ltd.) attached to a CM-1 type clock meter with a double-sided tape was reciprocated 10 times while it was brought into contact with the print portion. Black paper was placed under the film on which the solid image was printed, and the reflection density of the image of the scratched portion from the solid image surface side was measured with a spectrophotometer/colorimeter X-Rite 939. Further, the reflection density was similarly measured in the non-tested portion (the portion of the solid image that was not scratched). Thereafter, the reflection density in the non-tested part was subtracted from the reflection density in the scratched part, and the change in reflection density was evaluated according to the following evaluation criteria. Grade C or higher is preferable.

Evaluation Criteria

A: Viscosity change ratio is less than 3 percent

B: Viscosity change ratio is from 3 percent to less than 5 percent

C: Viscosity change ratio is 5 percent to less than 10 percent

D: Viscosity change ratio is 10 percent or greater

TABLE 1

|  | Example 1 | Example 2 | Example 3 | Example 4 | Comparative Example 1 | Comparative Example 2 |
|---|---|---|---|---|---|---|
| Ink (proportion of titanium oxide) | 1 (4.3) | 2 (4.3) | 3 (4.3) | 4 (4.3) | 5 (4.3) | 6 (8.5) |
| Resin emulsion (polyester polyol) (polyamine) | A (crystalline) (triamine) | B (crystalline) (triamine) | C (crystalline) (diamine) | D (crystalline) (—) | E (amorphous) (triamine) | E (amorphous) (triamine) |
| Tm (degrees C.) | 44.5 | 42.5 | 48.2 | 64.0 | — | — |
| Tc (degrees C.) | −2.4 | −19.0 | −1.4 | 46.0 | — | — |
| Tg (degrees C.) | — | — | — | — | −70.0 | −70.0 |
| brightness | A | A | A | A | C | A |
| Scratch resistance | A | A | B | C | D | D |
| Poor sedimentation | A | A | A | A | A | C |
| Storage Stability | A | A | B | C | A | B |

Evaluation Criteria
A: 0.1 or less
B: 0.1 to less than 0.2
C: 0.2 to less than 0.3
D: 0.3 or greater
Sedimentation The sedimentation of the pigment of the prepared white ink was evaluated using Turbiscan MA2000 (manufactured by EKO INSTRUMENTS CO., LTD.) Firstly, the white ink was subjected to ultrasonic dispersion treatment (100 W, 40 minutes) to make it uniform, and thereafter 5.5 ml was put into a special glass cell using a pipette. Evaluation of sedimentation started at 30 minutes after the liquid level of the white ink was stabilized. Thereafter, the white ink was left still at 23 degrees C. and kept measured until 120 hours later. Sedimentation was checked and indicated by deviation using the start of sedimentation evaluation as reference. Sedimentation was checked by quantity survey (relative value mode) of the peaks representing changes of backscattered light mainly due to the production of supernatent and evaluated according to the following criteria:

Grade B or higher is preferable.
Evaluation Criteria
A: Relative change at 120 hours after the start of evaluation was less than 5 percent
B: Relative change at 120 hours after the start of evaluation was from 5 to less than 10 percent
C: Relative change at 120 hours after the start of evaluation was 10 percent or greater
Storage Stability Each white ink was sealed and stored at 70 degrees C. for two weeks, and the viscosity thereof was measured before and after storage. The rate change in viscosity was calculated according to the following relationship, and evaluated according to the following criteria:

Grade C or higher is preferable.

Viscosity change rate(percent)={(post-storage viscosity)−(pre-storage viscosity)}/(pre-storage viscosity)}×100

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A white ink, comprising:
a urethane resin; and
a coloring material,
wherein the white ink has a melting peak as measured by a differential scanning calorimeter in the following conditions:
Measuring conditions:
four grams of the white ink is dried at 70 degrees C. for 18 hours and at 120 degrees C. for 15 minutes to prepare a measuring sample, thereafter, a thermal property of the measuring sample is measured by a differential scanning calorimeter Q2000, available from TA Instruments, is measured in a nitrogen atmosphere in a flow rate of 50 mL/minutes under the following temperature conditions: a graph of endotherm amount and exotherm amount is created from measuring results to determine whether the measuring sample has the melting peak in a second temperature rising; and
Temperature Conditions:
Starting Temperature: −20 degrees C.
First temperature rising rate: 10 degrees C./min
Ending temperature: 130 degrees C.
Holding time: one minute
Temperature falling rate: 10 degrees C./min
Ending temperature: −50 degrees C.
Holding time: five minutes
Second temperature rising rate: 10 degrees C./min
Ending temperature: 130 degrees C.

2. The white ink according to claim 1, wherein the urethane resin has at least one of a cross-linking structure and an elongation structure derived from a polyamine.

3. The white ink according to claim 2, comprising the elongation structure derived from a polyamine, wherein the polyamine comprises a triamine.

4. The white ink according to claim 1, wherein the urethane resin has a melting point of from 40 to 100 degrees C.

5. The white ink according to claim 1, wherein the urethane resin has a crystallization temperature of from −30 to 50 degrees C.

6. The white ink according to claim 1, wherein a crystalline portion of the urethane resin comprises a polyester.

7. The white ink according to claim 1, wherein the coloring material comprises at least one of a metal oxide, an inorganic hollow particle, and a resin hollow particle.

* * * * *